Jan. 10, 1928.  
H. A. BAILEY  
DIRECTION SIGNAL FOR AUTOMOBILES  
Filed Jan. 7, 1927
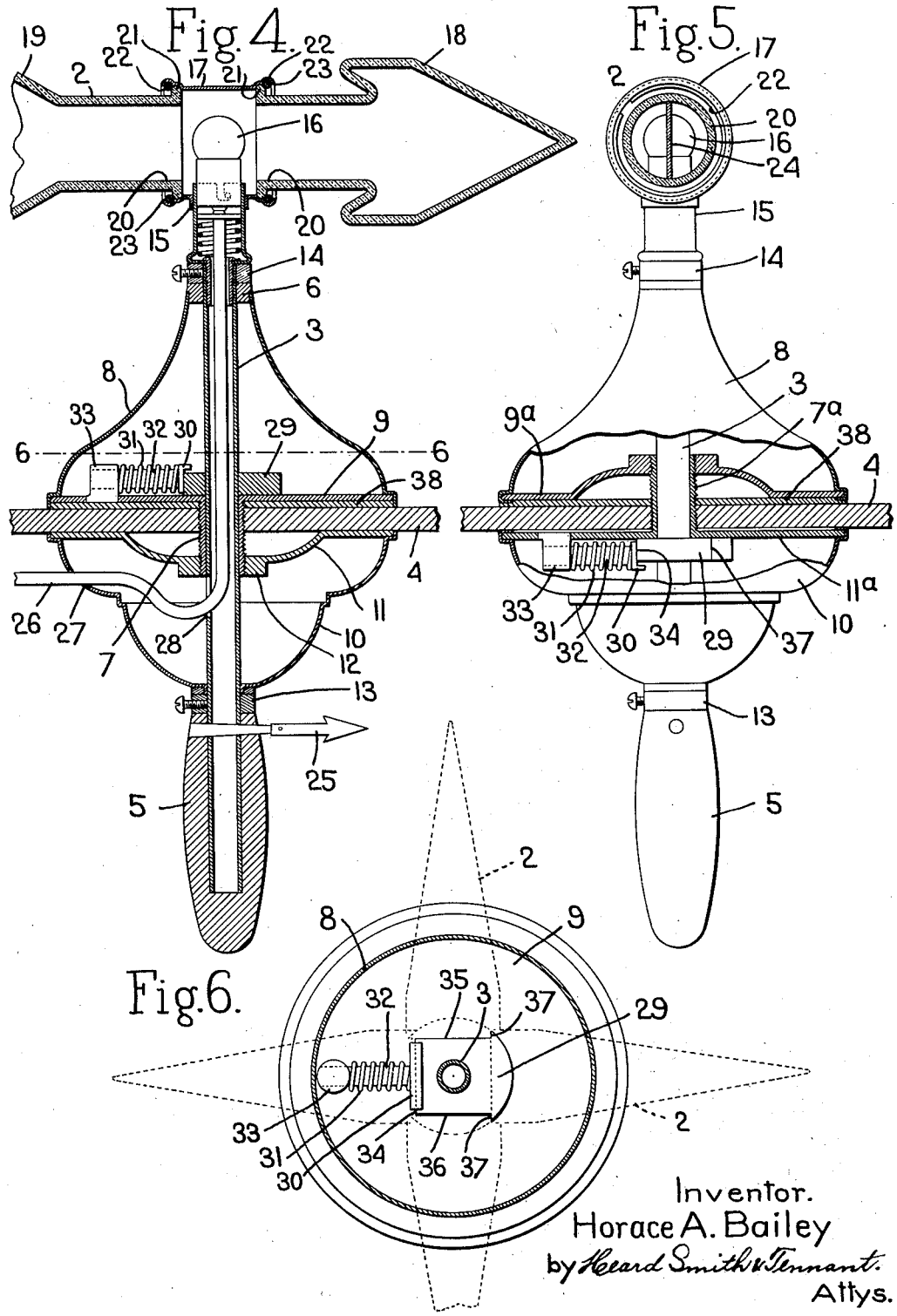
Inventor.  
Horace A. Bailey  
by Heard Smith & Tennant.  
Attys.

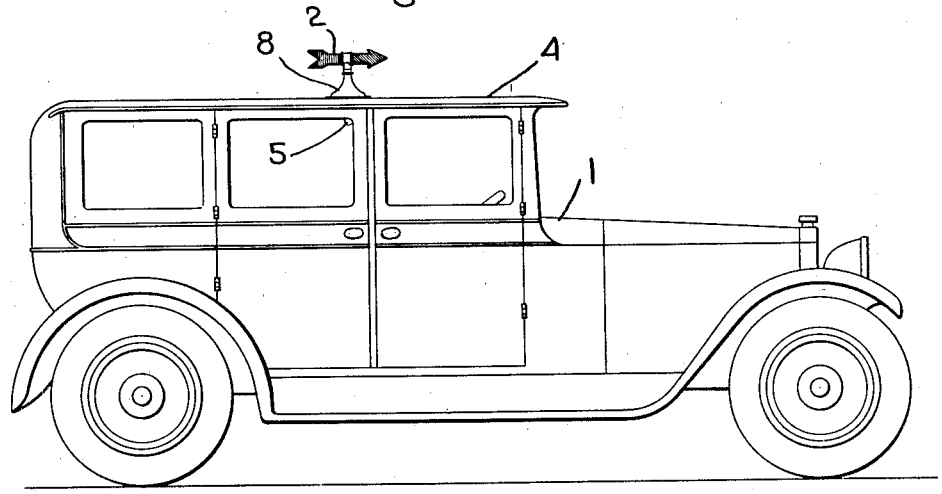
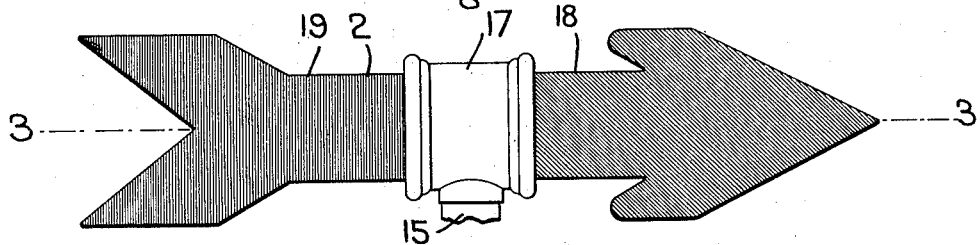
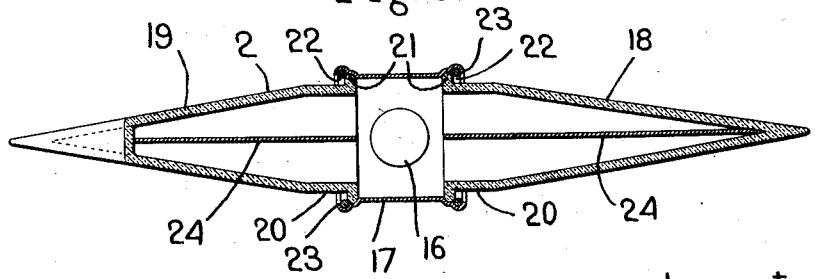

Patented Jan. 10, 1928.

1,655,402

UNITED STATES PATENT OFFICE.

HORACE A. BAILEY, OF NEWTON HIGHLANDS, MASSACHUSETTS.

DIRECTION SIGNAL FOR AUTOMOBILES.

Application filed January 7, 1927. Serial No. 159,539.

This invention relates to direction-indicating signals for automobiles and particularly to that type of signal which is designed to be placed on the roof of the automobile and to be manipulated from within the automobile.

The object of the invention is to provide an improved direction signal of this type which will have various novel features all as will be more fully hereinafter described and then set forth in the appended claims.

In the drawings, Fig. 1 is a view of an automobile having the improved direction signal applied thereto;

Fig. 2 is an enlarged side view of the indicating member;

Fig. 3 is a section on the line 3—3, Fig. 2;

Fig. 4 is a vertical section through the signal device;

Fig. 5 is a view partly broken out showing a slightly different embodiment of the invention;

Fig. 6 is a section on the line 6—6, Fig. 4,

In the drawings 1 indicates an automobile to which the improved signal is to be applied. The signal comprises a direction-indicating member 2 which may conveniently simulate an arrow, although it may have any shape without departing from the invention. This signal member is mounted on a hollow rod or shaft 3 which extends through the roof 4 of the automobile and is provided on its lower end with a handle 5 by which the shaft 3 may be turned thereby to manipulate the direction-indicating member 2 to indicate the direction in which the operator of the vehicle intends to go.

The shaft or rod 3 is journalled in suitable bearings 6 and 7 which are in turn supported by housing members that are clamped to the roof 4 and that provide a suitable finish for the signal device.

In the construction shown in Fig. 4 the upper bearing member 6 is formed in the upper end of a housing member 8 which may conveniently be formed of sheet metal and which is provided with the base portion or clamping flange 9 that rests on the top of the car roof 4. This base portion or clamping flange 9 has rigid therewith the bearing member 7, the latter being in the form of a hub which extends through an opening in the car roof 4 into the interior of the car.

10 indicates a lower housing member in the form of a canopy which has rigid therewith a clamping plate 11 that is formed with a screw-threaded opening 12 adapted to have screw-threaded engagement with the lower end of the bearing member 7. When the clamping member 11 is screwed onto the bearing member 7. as shown in Fig. 4, the two housing members 10 and 8 will be clamped to the top and bottom of the automobile roof 4 and thus the signal will be firmly retained in position.

I may, if desired, place a gasket or packing washer 38 beneath the clamping plate 9 to ensure the forming of a tight joint.

The shaft 3 extends down through the canopy 10 and the handle portion 5 is thus below the canopy where it can be easily reached and manipulated by the driver of the car. The shaft 3 is herein shown as having two collars 13 and 14 clamped thereon one below the canopy 10 and the other above the housing member 8, these collars serving to assist in holding the parts of the signal in proper relation. At the upper end of the shaft 3 is a socket member 15 of any suitable or usual type adapted to support an electric light bulb 16, the purpose of which is to illuminate the direction-indicating member 2. This direction-indicating member is formed with the central portion 17 and the two end portions 18 and 19, the end portion 18 simulating the point or tip of an arrow and the end portion 19 simulating the tail of the arrow. However, an indicating member of any other desirable shape may be employed without in any way departing from the invention.

Th) two end members 18 and 19 are preferably made of glass or some other transparent or translucent material and are detachably secured to the central portion 17. This central portion 17 has a cylindrical shape and is attached to and carried by the socket 15, the bulb 16 being enclosed within the cylindrical portion 17. The central cylindrical portion 17 is open at each end and the transparent or translucent portions 18 and 19 are detachably secured to the central supporting portion 17.

As herein shown each of the end portions 18 and 19 is hollow and is provided with the cylindrical neck 20 having a bead 21 thereon. The bead end of each end member 18 and 19 is received in one of the open ends of the central supporting member 17 and the end members are detachably retained in position by means of a split ring 22 which engages the outer edges of the bead 21 and is confined in place behind the lip 23 of the portion 17.

In order to better illuminate the direction-indicating member 2 I propose to insert in each of the end members 18 and 19 a vertical partition 24 which is of some highly reflecting but opaque material as celluloid. This reflecting material will be highly illuminated by the light 16 and the reflection of the light from the illuminated partition will illuminate the indicating member throughout its length. If desired, I may make the forward end 14 of the indicating member of one color and the rear end of another color, both ends, however, being made of transparent or translucent material. During the day time when it is not necessary to illuminate the member 2 the shape of the member will indicate the forward direction but at night when the shape is not readily distinguishable the different colors at the front and rear of the member 2 will give this information.

While any arrangement of colors may be employed I will preferably make the forward end 18 of a green color and the rear end 19 of a red color. The green will thus indicate the forward direction of the automobile.

So long as the driver of the car is proceeding straight ahead the signal device will be set as shown in Fig. 1. If he intends to make a left hand turn or right hand turn he will turn the signal device either to the left or right through 90° and will thus indicate to traffic officers, pedestrians and other cars the direction of his intended movement.

The handle 5 will preferably be provided with a telltale indicator 25 which is situated to point in the same direction as the indicating member 2. The driver of the car can tell how his signal is set merely by observing the position of the telltale 25.

26 indicates a circuit wire or a cable for conveying electricity to the bulb 16. This is shown as extending through an opening 27 into the canopy 10, thence through an opening 28 into the hollow shaft 3 and up through the shaft to the bulb 16.

Means are provided for yieldingly holding the signal set in either one of three positions, that is, either pointing straight ahead or pointing to the right or to the left. The means herein employed for this comprises a block 29 having flat sides 34, 35, 36 arranged at right angles to each other, which is fast on the shaft 3 and a spring-pressed flat-faced follower 30 which is yieldingly held against the block 29 by a spring 31. The positioning device 29 may be placed either in the housing member 8 or in the canopy 10. In Figs. 4 and 6 it is shown as in the housing member 8 and in Fig. 5 it is shown as in the canopy 10.

The follower 30 is illustrated as having a stem 32 rigid therewith, the rear end of which is slidable through an opening in a guiding boss 33 which in Figs. 4 and 6 is secured to the clamping plate 9. As the shaft is turned in either direction from the position shown in Fig. 6 a corner of the flat-faced block 29 will engage the flat-faced follower 30 and force the latter backwardly against the spring 32 and then the shaft has made a quarter of a turn the follower will be urged into engagement with one of the flat faces of the block 29 and will thus yieldingly hold the shaft in its adjusted position.

This block 29 is shown as provided with three flat faces 34, 35 and 36, the face 34 being engaged by the follower 30 when the signal is directed straight ahead, the face 35 being positioned to engage the follower when the signal is pointing to the right.

The block 29 is provided with two shoulders 37 which co-operate with the follower to limit the turning movement of the shaft in either direction and, therefore, the shaft can only have the three positions shown. With this construction the shaft and the signal will not remain in a halfway position, that is, half way between straight ahead or either right or left because the action of the spring 31 and the follower 30 will automatically hold the shaft when released in either one of the three positions as determined by the three faces 34, 35, 36.

In Fig. 5 the lower bearing member 7ª is shown as rigid with the under clamping plate 11ª which is rigid with the canopy 10 and the bearing member 7ª thus extends up through the car roof 4. In this embodiment the clamping plate 9ª of the housing member 8 is provided with the screw-threaded opening which has screw-threaded engagement with the upper end of the bearing sleeve 7ª thereby clamping the housing and canopy to the top and bottom of the roof. In this embodiment also the square flat-faced block 29 is situated below the clamping member 11ª in the canopy 10 and the guiding boss 33 is secured to the plate 11ª. In other respects, however, the device shown in Fig. 5 is similar to that above described.

The construction herein illustrated provides a signal device in which the operative parts are entirely enclosed in the housing and canopy and the latter may be conveniently shaped so as to present an attractive and ornamental appearance.

I claim:

1. In a direction signal for automobiles, the combination with two bearing members adapted to be clamped to the roof of the automobile, of a shaft journalled in said bearing members and extending through the roof, a direction-indicating member carried by the shaft, a positioning member fast on the shaft and provided with three flat faces arranged at right angles to each other and a spring-pressed flat-faced follower engaging the positioning member and co-operating therewith to hold the signal in the position in which it is set.

2. In a direction signal for automobiles, the combination with two bearing members adapted to be clamped to the roof of the automobile, of a shaft journalled in said bearing members and extending through the roof, a direction-indicating member carried by the shaft, a positioning member fast on the shaft and provided with three flat faces arranged at right angles to each other, and a spring-pressed flat-faced follower engaging the positioning member and co-operating therewith to hold the signal in the position in which it is set, said positioning member having shoulders to limit the turning movement of the shaft in either direction.

3. In a direction signal for automobiles, the combination with a bearing member adapted to extend through the roof of the automobile and having integral therewith a clamping flange adapted to engage said roof, of a clamping member screwed to the bearing member and also engaging said roof and by which the bearing member is clamped in position, a shaft extending through the bearing member, the lower end of the shaft being accessible for operation from within the automobile, and a direction indicator secured to the upper end of the shaft.

4. In a direction signal for automobiles, the combination with a bearing member adapted to extend through the roof of the automobile and having integral therewith a clamping flange adapted to engage said roof, of a clamping member screwed to the bearing member and also engaging said roof and by which the bearing member is clamped in position, a shaft extending through the bearing member, a handle on the lower end of the shaft within the automobile and by which the shaft may be manipulated, a direction indicator on the upper end of the shaft, and a telltale on the handle to indicate to those within the car the direction in which the signal indicator is pointing.

5. In a direction indicator for automobiles, the combination with a shaft extending through the roof of the automobile and means to turn the shaft, of a direction indicator on the upper end of the shaft, the end portions of which are of light transmitting material, a vertical partition of reflecting material extending longitudinally within each end portion of the direction indicator and a source of illumination at the center of the direction indicator, whereby the light reflecting from the light-reflecting partition will illuminate the end portions of the indicator.

6. In a direction signal for automobiles, the combination with a shaft projecting above the roof of the automobile, of a direction indicator secured to the upper end of the shaft, said direction indicator comprising a central portion in the form of a cylindrical hood which is secured to the shaft and end portions of light-transmitting material which are detachably secured to said central portion and a source of illumination within the direction indicator by which it is illuminated.

7. In a direction signal for automobiles, the combination with a shaft projecting above the roof of the automobile, and means to turn said shaft, of a direction indicator secured to the upper end of the shaft, said direction indicator comprising a central portion in the form of a cylindrical hood which is secured to the shaft, end portions of light-transmitting material which are detachably secured to said central portion, vertical partitions of light-reflecting material within each end portion, and a source of illumination in the central portion of the member whereby the light reflected from the partitions illuminates the end portions.

8. In a direction signal for automobiles, the combination with two housing members situated on the top and the bottom respectively of the roof of the automobile, each housing member having a clamping flange to engage said roof, one of said flanges having integral therewith a bearing member extending through the roof and the other flange having a screw-threaded engagement with said bearing member whereby the two housing members are clamped to the roof, a second bearing member carried by the upper housing member, a shaft extending through the two bearing members, and a direction-indicating member mounted on the upper end of the shaft.

9. In a direction signal for automobiles, the combination with two housing members situated on the top and the bottom respectively of the roof of the automobile, each housing member having a clamping flange to engage said roof, one of said flanges having integral therewith a bearing member extending through the roof and the other flange having a screw-threaded engagement with said bearing member whereby the two housing members are clamped to the roof, a second bearing member carried by the upper housing member, a shaft extending through the two bearing members, a direction-indicating member mounted on the upper end of the shaft, and means within one of the housing members for yieldingly holding the shaft in different adjusted positions.

In testimony whereof, I have signed my name to this specification.

HORACE A BAILEY.